United States Patent [19]
Pall et al.

[11] 3,850,813
[45] Nov. 26, 1974

[54] END CAPS WITH PERIPHERAL GROOVES FOR TUBULAR FILTER ELEMENTS AND PROCESS FOR MAKING THE SAME

[75] Inventors: David B. Pall, Roslyn Estate; Sidney Krakauer, Glen Cove, both of N.Y.

[73] Assignee: Pall Corporation, Glen Cove, N.Y.

[22] Filed: Oct. 27, 1972

[21] Appl. No.: 301,695

[52] U.S. Cl. .............................. 210/232, 210/497
[51] Int. Cl. .......................................... B01d 27/00
[58] Field of Search .................. 210/497, 493, 232; 285/DIG. 16, 347, 351, 423

[56] References Cited
UNITED STATES PATENTS

| | | | |
|---|---|---|---|
| 3,327,864 | 6/1967 | Ball et al. | 210/497 |
| 3,423,518 | 1/1969 | Weagant | 285/423 |
| 3,675,777 | 7/1972 | Heskett et al. | 210/497 |
| 3,695,443 | 10/1972 | Schmidt, Jr. | 210/497 |
| 3,747,772 | 7/1973 | Brown | 210/493 |

*Primary Examiner*—Samih N. Zaharna
*Assistant Examiner*—F. F. Calvetti

[57] ABSTRACT

End caps for tubular filter elements are provided with at least one peripheral groove free from flash and parting lines for reception of a sealing ring. The end caps are formed by bonding together a plurality of concentric abutting components, of which two provide the sides and one of those two the base of each peripheral groove. The concentric components can be bonded together to form the end cap at the same time as they are attached as the end cap to one end of the tubular filter element.

43 Claims, 6 Drawing Figures

END CAPS WITH PERIPHERAL GROOVES FOR TUBULAR FILTER ELEMENTS AND PROCESS FOR MAKING THE SAME

Tubular filter elements as conventionally used are arranged to accept fluid flow from one side of the tubular filter sheet, through the filter sheet to the other side, whence the filtrate flow is drawn off. Thus, all flow passes through the inside of the filter tube. Such tubular filter elements are normally manufactured by folding the filter sheet or sheets into the form of a tube or cylinder, lapping the opposite ends of the material thus brought together in a side seam, which is bonded together with an adhesive coating. The open ends of the tube are then closed by application of end caps, which are bonded to the tube ends with a suitable adhesive, or molded or fused thereto in situ, in accordance with the procedure, for example, described in U.S. Pat. No. 3,457,339, patented July 22, 1969, to David B. Pall and Tadas K. Jasaitis.

The end caps are usually provided with peripheral flanges which on their interior wall embrace the ends of the tube or cylinder, retaining the tube within the flanges, and ensuring a secure leak-tight seal. One or both of the end caps are provided with apertures, as required for fitting the filter element in a filter assembly, and they normally also are provided with one or more peripheral grooves at their top and/or on their exterior side wall, each groove being adapted to receive a sealing element or ring, which can be in an O- or U-shape, or other configuration, so as to ensure a leak-tight fit with the pipe connections in the fluid system, or a filter bowl or other component of the filter assembly.

The manufacture of end caps with one or more peripheral grooves for sealing rings presents special difficulties, which result in high production costs. The difficulties are increased and the costs multiplied when the peripheral grooves are required to be free from flash and parting lines, which is necessary if the sealing element is intended to prevent passage of bacteria and other microorganisms in gas systems. To mold end caps with grooves without flash or parting lines is not possible, as the part could not be withdrawn from the mold if this were attempted. A well designed and carefully built mold will provide a part with a minimum of flash, such as not to be readily discernible to the naked eye, but the flash may nevertheless be sufficient to allow leakage when assembled to the resilient sealing member. The leakage path can be large enough to allow bacteria to pass which can be as small as 0.2 micrometer. Furthermore, it is characteristic of molding practice that as the mold is used, wear occurs, causing the amount of flash to increase. Frequently, it is desirable to provide two or more peripheral grooves for two sealing elements, for better insurance against leakage and the bypassing of microorganisms, which merely increases the difficulties and the costs of manufacture.

In accordance with the invention, end caps for tubular filter elements are provided which are a composite of at least two concentric components, held together. Each peripheral groove requires at least two components, of which two provide the sides of the groove, and one of these two provides the base. One component can however provide the sides and even the bases of two grooves, so that the total number of components required is equal to the number of grooves required, plus one. Thus, of one peripheral groove is to be provided in the end cap, two concentric components are necessary. If two peripheral grooves are required, three concentric components are necessary. The components are concentric with respect to each other so as to nest together in closely abutting relation to form the end cap composite. They can be bonded together in any desired manner, such as by an adhesive, or by fusion, or by solvent bonding, or by spin welding.

Each concentric component except the innermost is in the form of an annulus. The innermost can be an annulus or a disc. Each component's height, taken with the other annuli or disc of the end cap composite, corresponds in the aggregate to the thickness of the end cap composite. Each component's diameter and width, taken with the other annuli or disc of the end cap composite, correspond in the aggregate to the breadth and span of closed area of the end cap composite. One exterior surface of at least one annulus, if not two or more, provides one exterior surface of the end cap composite. Another exterior surface of each annulus is provided with an outwardly extending peripheral projection constituting one side wall of a peripheral groove, and the peripheral projections of two abutting components define both sides of the groove, with a ledge adjacent such projection on one of such components defining the base of the groove.

The ledge on one component is arranged to abut a projecting portion of the next adjacent component, so that there are no flash lines and parting lines in the base of the groove, the components of the composite together defining one or more peripheral grooves with smooth sides and a smooth base.

The other end surface of at least one of the components, preferably the innermost, provides the other end surface of the end cap composite.

The filter end caps of the invention thus comprise a composite of a plurality of abutting concentric components, each having the configuration defined above, and all adhered or otherwise held together to form one piece.

In the process of the invention, end caps are formed by adhering together by bonding or fusing a composite of two or more components of this configuration, in a manner such that the abutting end surfaces of adjacent components form one end surface of the end cap composite, and the abutting projecting and ledge portions of the components define one or more peripheral grooves at the top or side of the end cap composite.

Figure 1:
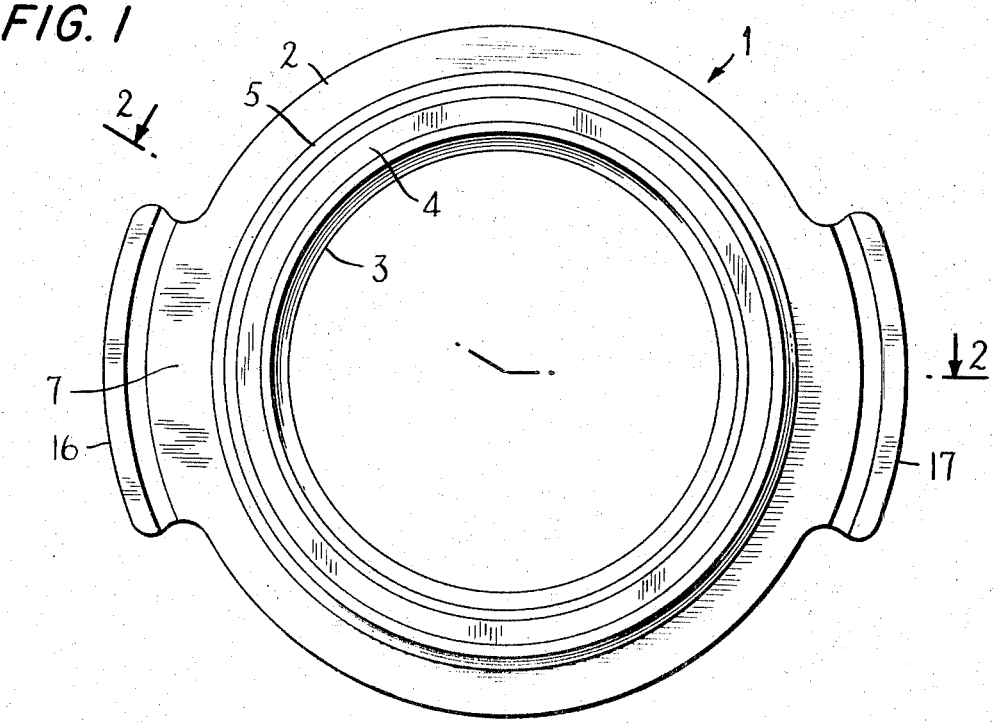
FIG. 1 represents a top view of an end cap composite in accordance with the invention, after bonding together of the three components thereof, all three components being annular.
Figure 2:
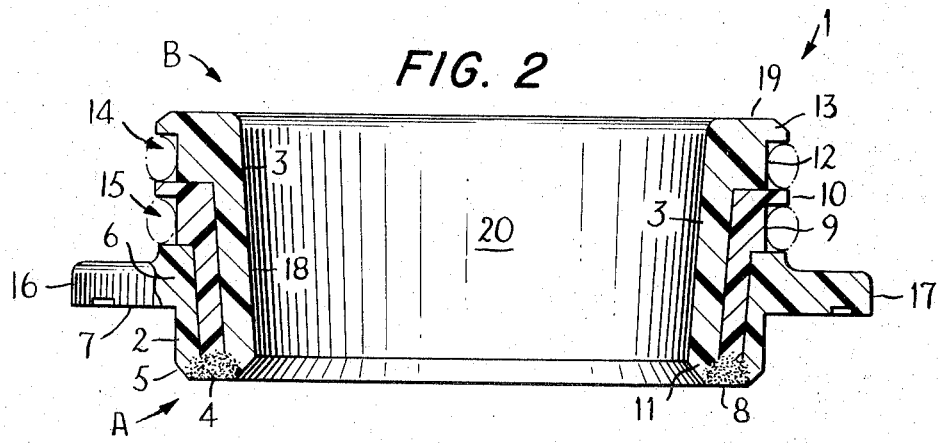
FIG. 2 represents a cross-sectional view of the end cap composite of FIG. 1, taken along the lines 2—2, and looking in the direction of the arrows.

The end cap 1 of FIGS. 1 and 2 comprises an outer annulus 2, an inner annulus 3, and an intermediate annulus 4, all of thermoplastic resin such as polypropylene, fused together only at one end A, by any suitable procedure. The annulus 2 has an end wall 5, and a peripheral flange 7. The annulus 4 has an end portion 8, a ledge 9, and a peripheral flange 10. The annulus 3 has an end portion 11, a ledge 12, and a peripheral flange 13. The peripheral flanges 10 and 13 of annuli 4 and 3, respectively, define a peripheral groove 14, with the ledge 12 constituting the base. The peripheral flanges 10 and 7 of annuli 4 and 2, respectively, define a peripheral groove 15, with the ledge 9 constituting the base. Each groove is suitable for reception of an O-ring, shown in dashed lines in FIG. 2. The flange 7 of the annulus 2 has two lug portions 16, 17. The interior wall 18 of the inner annulus 3 defines a passage 20 through the end cap. End surfaces 5, 8 and 11, which are fused together, define one end surface of the end cap, and the end surface 19 of the inner annulus 3 defines the surface at the other end B of the end cap.

The end cap would usually be bonded to the filter tube at end A, since this is the face where the annuli ends are to be bonded together, but the end cap can also be bonded to the tube at end B. The annuli are not fused or bonded at the grooves 14, 15, to avoid distorting or encrusting the smooth sides and bases of these grooves. The passage 20 is tapered, but it need not be; it can also be cylindrical, or flared.

The three annuli forming the composite of FIGS. 1 and 2 can readily be held together at side A only by any bonding procedure, such as by use of an adhesive, or by fusion welding, or solvent bonding. If desired, the bonding operation can be carried out simultaneously with the affixing of the end cap to a filter cylinder, which also can be accomplished by use of an adhesive.

To prepare the structure shown in FIGS. 1 and 2, the end cap composite can be bonded together, and the filter element bonded to the end cap at the same side by fusion of one face only of the end cap, using the technique described in U.S. Pat. No. 3,457,339, patented July 22, 1969, to David B. Pall and Tadas K. Jasaitis. The face of the composite where the seams between the annuli come to the surface, for example, end A, where the surfaces 5, 8, 11 come together, can be fused into a liquid of a viscosity capable of penetrating through the pores of an end of a filter sheet from one surface to the other. While this face of the end cap is liquefied, the other face of the end cap can be cooled to a temperature below the softening point of the thermoplastic material, to maintain the remainder of the cap solid. The end of the filter sheet is then embedded in the liquefied face of the end cap, so that the liquefied thermoplastic material penetrates through the pores of the filter from one surface of the filter to the other. At the same time, the liquefied ends of the annuli 2, 3, 4 also run together and fuse. Upon hardening of the plastic material of the end cap, a continuous leakproof matrix of the end cap material in the pores of the filter material is formed at the interface between the end of the filter sheet and the end cap, thereby bonding the filter sheet to the end cap in a leakproof seal, and at the same time bonding together the three annuli of the composite in one piece, but only in the liquefied portion. The remainder of the abutting portions of the annuli of the composite are not bonded together, and need not be, since any opening therebetween terminates as a dead end at the fused portion. Since the end of the annulus carrying the projections which define the peripheral grooves of the end cap is not softened or fused, there is no possibility of distortion, or of forming flash or parting lines or other irregularities in this portion. Therefore, each component of the composite can be molded true to the desired configuration of the peripheral groove without any danger of distortion of the groove or end cap during the bonding of the components together to form the end cap composite.

Figure 3:
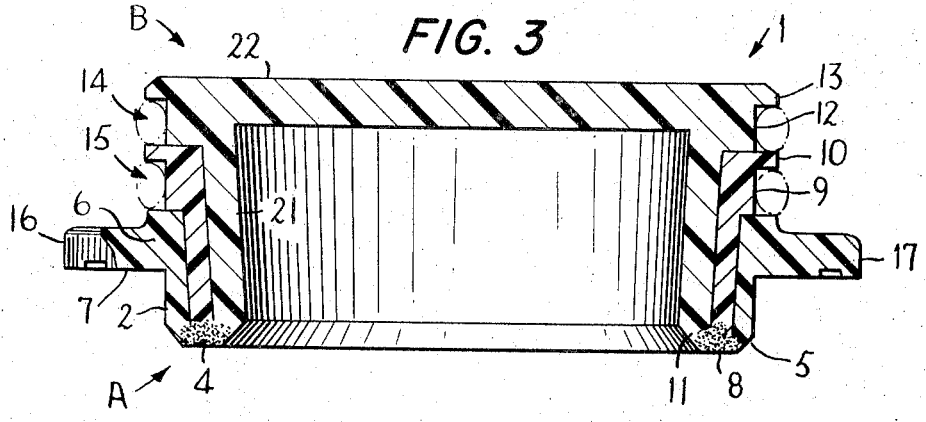
FIG. 3 represents a cross-section another embodiment of an end cap composite of the invention in which the two outer components are annular, and the innermost component is in the form of a disc, thus providing a closed end cap closing off the interior space of a tubular filter element at that end.

The end cap composite shown in cross-section in FIG. 3 is similar to that of FIGS. 1 and 2, and like portions bear like numbers, but in this case the innermost component 21 is not a true annulus, but is in the shape of a dished disk, with a flat end 22, and no passage or aperture therethrough. Consequently, in this case the end cap closes off the interior of the filter to access to and from the outside, except through the filter, or through the other end cap of the cylinder, which may be apertured, and thus of the configuration shown in FIGS. 1 and 2.

Figure 4:
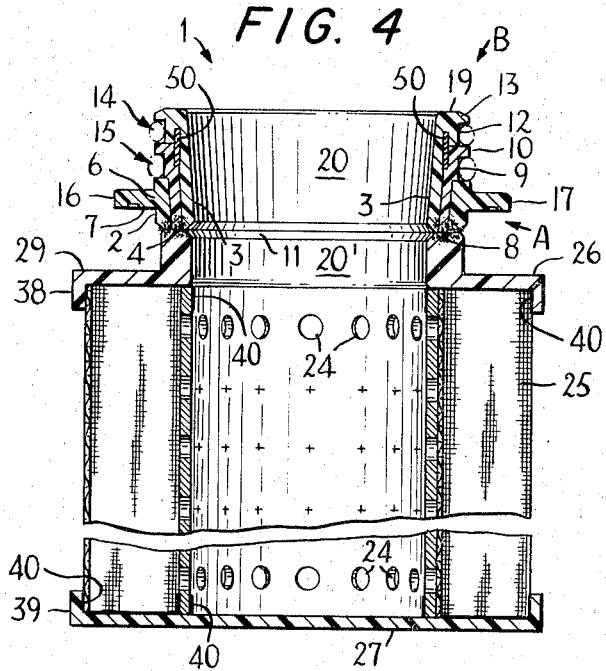
FIG. 4 represents in cross section another embodiment of end cap composite in which annular elements are added to a base end cap bonded to the filter element tube in advance.

It is also possible, and in many commercial applications eminently practical, to cap the filter cylinder with standardized base end caps in advance, and then join to these base caps, which can themselves serve as the base annulus, the remaining annuli needed to add the number of peripheral grooves desired on the end cap. These also can be linked together in advance, in sets, to fit standardized end cap forms, and bonded to the base end caps as required. This procedure minimizes inventory by allowing a large variety of end caps to be assembled to filter elements starting from a few basic components. Such a structure is shown in FIG. 4.

In this case, the filter element 25 in tubular form with an internal perforated metal core 24 has open ends closed off by end caps 26, 27, of which one 27 is closed and one 26 has central aperture 20.

Figure 5:
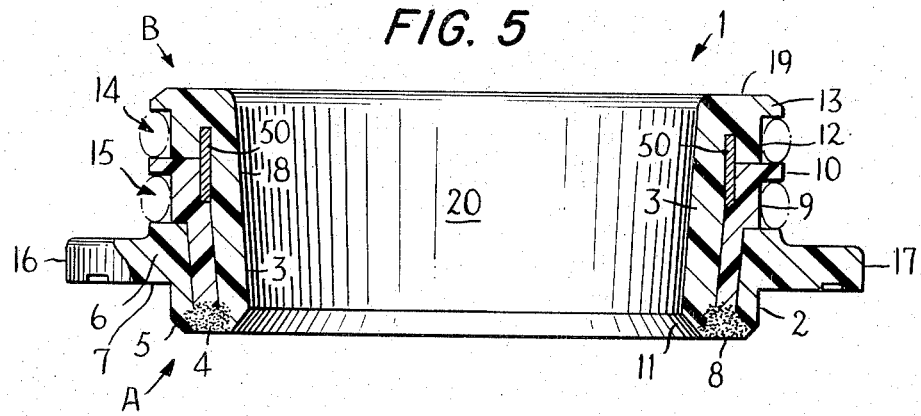
FIG. 5 represents in cross section another embodiment of end cap composite including an internal support to resist creep of plastic annuli during heat treatment such as is applied in order to sterilize an element prior to using it for bacteria or yeast removal.

The end cap composite 26, shown in a detailed view in FIG. 5, has a stainless steel ring 50 between the innermost annulus 3 and the intermediate annulus 4. The ring backs up both grooves 14, 15 and provides internal support for both. The ring is locked in place by the bond between the annuli at end A, which is bonded to the end cap 26.

Annulus 2 has a peripheral flange 16, annulus 4 has a peripheral flange 10, and annulus 12 has a peripheral flange 13, which between them define grooves 15 and 14, respectively. All three annuli are bonded at their ends to the end cap 26, about their central apertures. The three-annulus set can be bonded together in advance, and then bonded to the end cap 26, or all three annuli and the end cap can be bonded together simultaneously.

The inner sides of the end caps 26, 27 are flanged at 38, 39 and bonded to the filter tube 25 and internal core 24 by any suitable adhesive 40, or by the procedure of U.S. Pat. No. 3,457,339, described above.

While thermoplastic resins are particularly suitable for use as the annuli of the end cap composites of the invention, they sometimes evidence creep or dimensional instability at temperatures approaching their softening temperature, especially under compression by a sealing ring inserted in the peripheral grooves thereof. Such change in dimensions can be resisted or prevented by incorporating an internal support, in the form of a metal or nonthermoplastic resin ring, in the composite. The support can be at the inside periphery of the composite, or between annuli of the composite.

Figure 6:
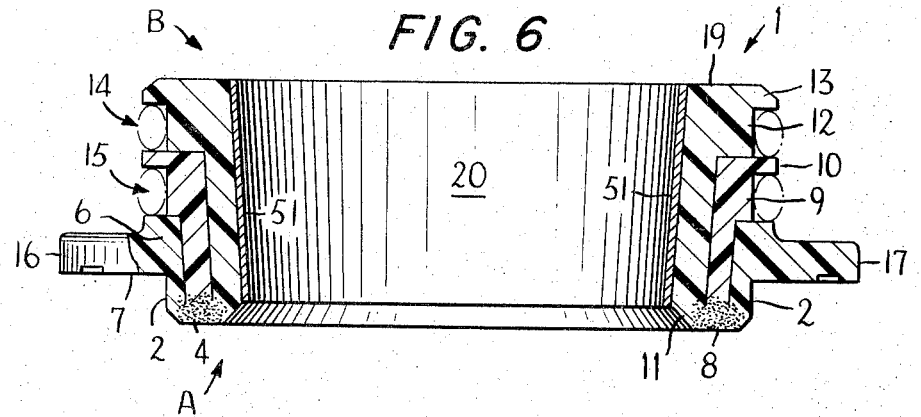
FIG. 6 represents in cross section another embodiment of end cap composite with another type of internal support.

The end cap composite of FIG. 6 has a stainless steel ring 51 at the inner periphery of the innermost annulus 3, bonded thereto by an adhesive. This ring extends the entire length of the passage 20, and provides internal support behind grooves 14, 15 and above flange 7.

It will be apparent that the innermost annulus can of course be formed with any size aperture as desired, and that the several annuli can be as thick and as broad as desired, according to the thickness and breadth of end cap required to close off the end of a tubular filter element. This is usually determined by the diameter and the depth of the corrugations of the tubular filter element which is to be embedded therein, since any corrugations must be bonded to or wholly embedded from hill to dale in end cap material.

By appropriate design of the component's shape and configuration, it is possible, in accordance with the invention, to prepare end caps for any type of tubular filter element, in any configuration. The components are selected so as to, in the aggregate, form an end cap with the desired number of peripheral grooves, and appropriate to the configuration of the tubular filter element to be capped off. Normally, the filter elements are in cylindrical corrugated form, but it will be apparent that end caps can be prepared applicable to tubular elements in any cross-sectional configuration, including plain, folded, convoluted, and corrugated, triangular, square, rectangular, elliptical, and, indeed, any polygonal filter tubes. The size and configuration of the convolutions in the case of a corrugated element are immaterial, and so also is the thermoplastic material of which the filter element and end caps are made.

The invention is applicable to filter elements made of any filter material. If the material has insufficient rigidity to be self-supporting, the tube can be made so by incorporation of a central core or support, such as a spring or tube of rigid metallic or plastic material, for instance, a perforated metal core or spring of conventional construction. It will usually be desirable in such a case to have internal support over a length substantially equal to that of the tubular filter element, so that the internal support and the edges of the filter element are in a substantially flush-fit with the end cap, when they are bonded thereto. The end cap composite can be furnished with appropriate raised or depressed portions in the surfaces of the several components to meet, in the aggregate, the shape requirements at the ends of the filter support, and the folds or convolutions of the filter tube, and in accordance with the requirements of the filter assembly in which the filter element is to be used.

Thus, the invention is applicable to filter elements made of any porous sheet material, having pores extending from surface to surface. One or several layers of the same or varying porosity can be employed, in close juxtaposition, or even bonded together, or also spaced apart. Paper, which can, if desired, be resin-impregnated is a preferred base material, since it yields an effective, versatile and inexpensive fluid-permeable filter medium. The invention is, however, applicable to papers and like sheet materials formed of any type of fiber, including not only cellulose fibers, but also synthetic resin fibers, and fibers of other cellulose derivatives, including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides, and protein fibers of various sorts, such as zein and the alginates, glass, asbestos, potassium titanate, mineral wool, polystyrene, potassium titanate, rubber, casein, hemp, jute, linen, cotton, silk, wool, and mohair. Also useful, in addition to papers, are textile fabrics, and woven and nonwoven fibrous layers of all kinds, such as felts, mats and bats made of fibrous materials of any of the types listed below.

The filter sheet material of which the filter elements of the invention are made, if desired, can be impregnated with a synthetic resin or cellulose derivative, to increase its strength and resistance to wear by the fluid being filtered. The impregnating agents can be in liquid form, capable of undergoing solidification as by polymerization, cross-linking, or the like. They can also be in solid form, and applied to the base from a solution in an inert solvent, or as melts. Representative impregnating resins include phenol-formaldehyde resins, urea-formaldehyde resins, melamineformaldehyde resins, polyester resins, and polyepoxide resins.

The process of the invention is particularly applicable to microporous filter elements. Microporous filter elements may be defined as having an average pore size of less than about 5 microns and preferably an average pore size of less than about 0.5 micron. There is no effective lower limit on the pore size of the microporous filter, except that imposed by the excessive pressure required to force water to pass through the filter, an unduly low rate of flowthrough, and more rapid plugging. It has been found, in practical applications, that microporous filters having an average pore size as low as 0.02 micron and even lower can be end capped in accordance with the invention.

The depth or thickness of the microporous fibrous filter is not critical. A thick filter operates efficiently, but it should not create an undue pressure drop.

A preferred microporous filter is made of a porous base, such as paper, having relatively large pores, within or on the surface of which is deposited particulate material in an amount to diminish the average diameter thereof to less than 1 micron while retaining a voids volume in the microporous portion in excess of 75 percent, as disclosed in U.S. Pat. Nos. 3,238,056 to Pall et al., dated Mar. 1, 1966, No. 3,246,767 to Pall et al., dated Apr. 19, 1966, No. 3,353,682 to Pall et al., dated Nov. 21, 1967, No. 3,407,252 to Pall et al., dated Oct. 22, 1968, No. 3,573,158 to Pall et al., dated Mar. 30, 1971, and No. 3,591,010 to Pall et al., dated July 6, 1971, the disclosures of which are herein incorporated by reference. The particulate material, which can be in the form, for example, of fibers or fine structured granules, is suspended in a fluid and deposited therefrom upon the surface of the porous base material. The particulate material can all be of the same size and type, or of two or more sizes and types, all suspended in the fluid system. The desired reduction in pore diameter of the base is obtained by varying the size and amount of the particulate material deposited, blending different sizes at different points, if desired. A particularly preferred microporous filter is one of the type described in U.S. Pat. No. 3,246,767 which comprises a porous base having superimposed thereon and adherent thereto a microporous layer comprising a fibrous material of which a proportion of fibers extend outwardly from the porous base at an angle greater than 30°, the microporous layer having an average pore diameter of less than 1 micron and a voids volume of at least 75 percent. The fiber spacing and angular disposition to the base throughout the entire microporous layer is noted by cross-sectional examination, upon sufficient magnification through an optical or electron microscope. The angular disposition of the fibesrs is in a large measure responsible for the high voids volume and low pore size characteristic of these microporous filters.

The concentric components are designed to form end caps of any desired configuration, appropriate to the requirements of the filter tube and filter assembly. Usually, at least one of the end caps will be provided with an aperture for delivery of filtered fluid from or unfiltered fluid to the interior of the structure. In many instances, both end caps will be apertured, particularly where a plurality of filter elements are to be connected together to form a long tube.

The components are concentric to facilitate assembly in a nesting relationship to each other in a composite and to a tubular filter element. The several components of a composite should be formed to nest in a closely abutting manner, although this is not essential, so as to facilitate nesting and bonding together to form the composite. However, spaces between adjacent components can be erased by fusion bonding or welding, or plugged with adhesive or bonding agent. If the components nest snugly, the composite can be handled as a unit even prior to bonding.

The components can be bonded together to form one piece either before or after bonding to a tubular filter element.

The components can be formed of any material that can be cast or molded in the configuration desired. Malleable or castable metals can be used, such as low- and high-melting alloys, for example: lead and lead alloys, such as lead-antimony, lead-tin, and lead-cadmium alloys, magnesium alloys, such as magnesium-manganese and magnesium-aluminum alloys, and zinc-copper alloys.

Also useful are thermosetting and thermoplastic resinous materials. Thermosetting resins can be used in an intermediate stage of polymerization and brought to a cured thermoset state in the course of bonding the components together to form the end cap. Exemplary are phenol-formaldehyde resins, urea-formaldehyde resins, polyester resins, epoxy resins, and coumarone-indene resins. If the components are in a cured state after forming, they can be bonded together by an adhesive.

Thermoplastic resins are most useful, since they can be liquefied and so bonded together using the process of U.S. Pat. No. 3,457,339. As is well known in the field of plastics, most thermoplastic materials have a wide range of temperatures over which they can be softened. However, it is only after the thermoplastic material is heated to a temperature above its maximum softening point that the material is liquefied. Accordingly, the components for forming end caps that are suitable for use herein can be made from any thermoplastic resin that is in, or can be brought to, a liquid state, as by heating to above its maximum softening point. If an ultrafine filter material, i.e., filter material having an average pore size less than about 5 microns, is employed, the thermoplastic material employed in the end cap preferably when liquid has a low viscosity, and preferably less than about 50 c.p., to ensure that the resin can penetrate the pores of the filter material, and thus form a leakproof seal.

The end cap resin materials can be employed alone, with conventional fillers and/or pigments and/or in solution in a suitable solvent. Typical resins which can be employed herein, their softening range, and their liquefaction temperature, are set out in the table below. It is to be understood that the liquefaction temperature of the resins listed hereinafter varies with the molecular weight of the resins, and that the softening range listed for each resin is for the most common form of the particular resin.

TABLE

| Name | Softening Point | Liquefaction Point |
| --- | --- | --- |
| Polyethylene | About 221°F. | Above 110 to 115°C. |
| Polypropylene | 285–320°F. | Above 320°F. |
| Polyisobutylene | | Above 355°F. |
| Polystyrene | 190–230°F. | Above 230°F. |
| Polyamides (nylon) | 450–485°F. | Above 485°F. |
| Cellulose acetate | 115–230°F. | Above 230°F. |
| Ethyl cellulose | 210–270°F. | Above 270°F. |
| Cellulose acetate butyrate | 140–250°F. | Above 250°F. |
| Copolymers of vinyl chloride and vinyl acetate | 140–150°F. | Above 150°F. |
| Polyvinyl chloride | 250–350°F. (Varies with plasticizer) | Above 300°F. |
| Polyvinylidene chloride (Saran) | 100–325°F. | Above 325°F. |
| Vinylidene chloride-vinyl chloride (90-10) copolymer (Saran) | 230–280°F. | Above 280°F. |
| Polyvinyl butyral | 140–158°F. | Above 158°F. |
| Polytrifluorochloro-ethylene (Kel-F) | 346° to 570° F. depending on molecular weight | Depends on molecular weight |
| Polymethyl methacrylate | 140–230°F. | Above 230°F. |
| Synthetic rubbers such as hard rubber | 150–190°F. | Above 190°F. |

In addition to the above materials, other thermoplastic materials such as lignin-sulfonate resins, terpene resins, and the like can be used herein. The term "thermoplastic" is accordingly used herein to refer both to thermoplastic resins and to such resins in a liquid stage of polymerization, further polymerizable to a solid polymer.

As indicated hereinbefore, the invention is applicable to filter elements made of any filter material and end caps made of any thermoplastic material. However, where the end cap and the filter material are of the same material, the seal formed between the end cap and the edges of the filter is exceptionally strong.

Since no two materials have precisely the same chemical resistance to all media to be filtered, it has been found to be desirable to employ heat-sealed filter materials, internal core supports, and end caps which are substantially of the same thermoplastic material under corrosive conditions or where contamination of the filter material, internal support core and/or end cap by the medium being filtered is a problem. Thus, for example, where a corrosive fluid is being filtered, the internal support or core, filter material and end cap can be made entirely from thermoplastic resins, such as polyethylene or polypropylene, or any of the other thermoplastic materials set forth hereinbefore, and the filter material heat-sealed. A filter element made entirely of one material is resistant to attack to a wide range of reagents, and hence is more widely useful than a filter element wherein a second component has been introduced, thereby limiting its range of application.

The tubular end-capped element obtained in accordance with this embodiment of the invention thus comprises, in combination, a filter sheet material formed in a closed configuration having at least one open end, and an end cap composite of at least two concentric components closing off at least one open end, and formed of thermoplastic resin, the open end of the filter sheet being embedded in the end cap composite to a depth of from about 10 percent to about 90 percent of the cap thickness, the thermoplastic cap material permeating the sheet material from face to face thereof thereby forming a continuous leakproof matrix of filter and thermoplastic resin at the interface between the end cap and the filter sheet material, ensuring a leakproof seal therebetween.

Having regard to the foregoing disclosure, the following is claimed as the inventive and patentable embodiments thereof:

1. A filter element end cap having at least one peripheral groove, for use in capping tubular filter elements, which comprises a composite of abutting concentric components capable of being bonded together in one piece; of which components two abutting components provide the sides of each peripheral groove and one of these two components provides the base; the total number of such components being at least equal to the number of peripheral grooves, plus one; and the outermost component is an annulus; the composite having one face shaped to be bonded to one end of a tubular filter element in a fluid-tight seal to cap the tubular element, and having another face shaped to attach the capped filter element in fluid-flow connection to a fluid system in a fluid-tight seal, with a sealing element in at least one peripheral groove, the peripheral grooves having fixed dimensions after bonding together of the concentric components, and having smooth sides and base for fluid-tight sealing engagement with a sealing element and a fluid system.

2. An end cap according to claim 1, having one peripheral groove and two concentric components.

3. An end cap according to claim 1, having two peripheral grooves and three concentric components.

4. An end cap according to claim 1, in which the components nest together in closely abutting relation to form the end cap composite.

5. An end cap according to claim 1, in which the components are bonded together by an adhesive.

6. An end cap according to claim 1, in which the components are bonded together by fusion.

7. An end cap according to claim 1, in which the components are bonded together by solvent bonding.

8. An end cap according to claim 1, in which the components are bonded together by spin welding.

9. An end cap according to claim 1, in which the innermost component is an annulus.

10. An end cap according to claim 1, in which the innermost component is a disk.

11. An end cap according to claim 1, having an internal support to improve dimensional stability of the abutting concentric components.

12. An end cap according to claim 11, in which the support is a metal ring.

13. An end cap according to claim 11, in which the support is disposed between abutting concentric components.

14. An end cap according to claim 11, in which the support is disposed at the inner periphery of the annular component that is innermost.

15. An end cap according to claim 1, in which each component's height, taken with the other annuli or disk of the end cap composite, corresponds in the aggregate to the thickness of the end cap composite, each component's diameter and width, taken with the other annuli or disk of the end cap composite, correspond in the aggregate to the breadth and span of closed area of the end cap composite, one exterior surface of at least one annulus provides one exterior surface of the end cap composite, another exterior surface of each annulus is provided with an outwardly extending peripheral projection constituting one side wall of a peripheral groove, and the peripheral projections of two abutting components define both sides of the groove, with a ledge adjacent such projection on one of such components defining the base of the groove, the ledge on one component being arranged to abut a projecting portion of the next adjacent component, so that there are no flash lines and parting lines in the base of the annulus, the components of the composite together defining one or more peripheral grooves with smooth sides and a smooth base, the other end surface of at least one of the components providing the other end surface of the end cap composite.

16. A filter end cap comprising a composite according to claim 1 of a plurality of abutting concentric components, and all held together to form one piece.

17. A process for forming filter end caps having at least one peripheral groove, for use in capping tubular filter elements, which comprises assembling a composite of abutting concentric components of which two abutting components provide the sides of each peripheral groove and one of these two components provides the base, the total number of such components being at least equal to the number of peripheral grooves plus one, and the outermost component is an annulus, and adhering the components of the composite together to form a one-piece filter end cap in which the peripheral grooves have fixed dimensions and smooth sides and base for fluid-tight sealing engagement with a sealing element and a fluid system.

18. A process according to claim 17, which comprises adhering one open end of a tubular element to the end cap at the same time as the composite is adhered together in one piece.

19. A process according to claim 18, which comprises embedding an open end of a tubular element in one side of the composite at the same time as that side is fused to bond the composite together, while maintaining the remainder of the composite above the softening point thereof, whereby each component of the composite can be molded true to the desired configuration of the peripheral groove, without any danger of distortion of the groove or end cap during the bonding of the components together and to the tubular filter element.

20. A tubular end-capped filter element comprising, in combination, a filter sheet material formed in a closed configuration having at least one open end, and an end cap composite having at least one peripheral groove and comprising a plurality of abutting concentric components; of which two abutting components provide the sides of each peripheral groove and one of these two components provides the base; the total number of such components being at least equal to the number of grooves, plus one; and the outermost component is an annulus; having at least two concentric components adhered together and to the filter sheet material in a fluid-tight seal and closing off at least one open end of the tubular filter element.

21. A tubular end-capped filter element in accordance with claim 20, in which the end cap composite is formed of thermosplastic resin, the open end of the filter sheet being embedded in the end cap composite to a depth of from about 10 percent to about 90 percent of the cap thickness and the thermoplastic cap material permeating the sheet material from face to face thereof thereby forming a continuous leakproof matrix of filter and thermoplastic resin at the interface between the end cap and the filter sheet material, ensuring a leakproof seal therebetween.

22. An end cap having at least one peripheral groove, for use in capping tubular filter elements, which comprises a composite of abutting concentric components of thermoplastic resinous material capable of being bonded together in one piece by softened integration of the thermoplastic resinous material, of which components two abutting components provide the sides of each peripheral groove and one of these two components provides the base; the total number of such components being at least equal to the number of grooves, plus one; and the outermost component is an annulus, the peripheral grooves having fixed dimensions after bonding together of the concentric components, and having smooth sides and base for fluid-tight sealing engagement with a sealing element and a fluid system.

23. An end cap according to claim 22, in which the components are bonded together by heat softening.

24. An end cap according to claim 22, in which the components are bonded together by solvent bonding.

25. An end cap according to claim 22, in which the components are bonded together by spin welding.

26. A tubular end capped filter element comprising, in combination, a filter sheet material formed in a closed configuration having at least one open end; at least one end cap adhered to the filter sheet material in a fluid-tight seal and closing off at least one open end; and, attached to at least one end cap, an end cap composite having at least one peripheral groove and comprising a plurality of abutting concentric components, of which two abutting components provide the sides of each peripheral groove, and one of these two components provides the base; the total number of such components being at least equal to the number of grooves, plus one; and the outermost component is an annulus.

27. A tubular end cap filter element according to claim 26, in which the end cap and the end cap composite are formed of thermoplastic resinous material, and are adhered together to form a one-piece end cap.

28. A filter element end cap having at least one peripheral groove, for use in capping tubular filter elements, which comprises a composite of abutting concentric components capable of being bonded together in one piece; of which components two abutting components provide the sides of each peripheral groove and one of these two components provides the base; the total number of such components being at least equal to the number of peripheral grooves, plus one; and the outermost component is an annulus; the composite having one face shaped to be bonded to one end of a tubular filter element end cap in a fluid-tight seal to complete the tubular element end cap, and having another face shaped to attach the capped filter element in fluid-flow connection to a fluid system in a fluid-tight seal, with a sealing element in at least one peripheral groove, the peripheral grooves having fixed dimensions after bonding together of the concentric components, and having smooth sides and base for fluid-tight sealing engagement with a sealing element and a fluid system.

29. An end cap according to claim 28, having one peripheral groove and two concentric components.

30. An end cap according to claim 28, having two peripheral grooves and three concentric components.

31. An end cap according to claim 28, in which the components nest together in closely abutting relation to form the end cap composite.

32. An end cap according to claim 28, in which the components are bonded together by an adhesive.

33. An end cap according to claim 28, in which the components are bonded together by fusion.

34. An end cap according to claim 1, in which the components are bonded together by solvent bonding.

35. An end cap according to claim 28, in which the components are bonded together by spin welding.

36. An end cap according to claim 1, in which the innermost component is an annulus.

37. An end cap according to claim 1, in which the innermost component is a disk.

38. An end cap according to claim 28, having an internal support to improve dimensional stability of the abutting concentric components.

39. An end cap according to claim 28, in which the support is a metal ring.

40. An end cap according to claim 38, in which the support is disposed between abutting concentric components.

41. An end cap according to claim 38, in which the support is disposed at the inner periphery of the annular component that is innermost.

42. An end cap according to claim 28, in which each component's height, taken with the other annuli or disk of the end cap composite, corresponds in the aggregate to the thickness of the end cap composite, each component's diameter and width, taken with the other annuli or disk of the end cap composite, corresponds in the aggregate to the breadth and span of closed area of the end cap composite, one exterior surface of at least one annulus provides one exterior surface of the end cap composite, another exterior surface of each annulus is provided with an outwardly extending peripheral projection constituting one side wall of a peripheral groove, and the peripheral projections of two abutting components define both sides of the groove, with a ledge adjacent such projection on one of such components defining the base of the groove, the ledge on one component being arranged to abut a projecting portion of the next adjacent component, so that there are no flash lines and parting lines in the base of the annulus, the components of the composite together defining one or more peripheral grooves with smooth sides and a smooth base, the other end surface of at least one of the components providing the other end surface of the end cap composite.

43. A filter end cap comprising a composite according to claim 28 of a plurality of abutting concentric components, and all held together to form one piece.

* * * * *